Figure 1:
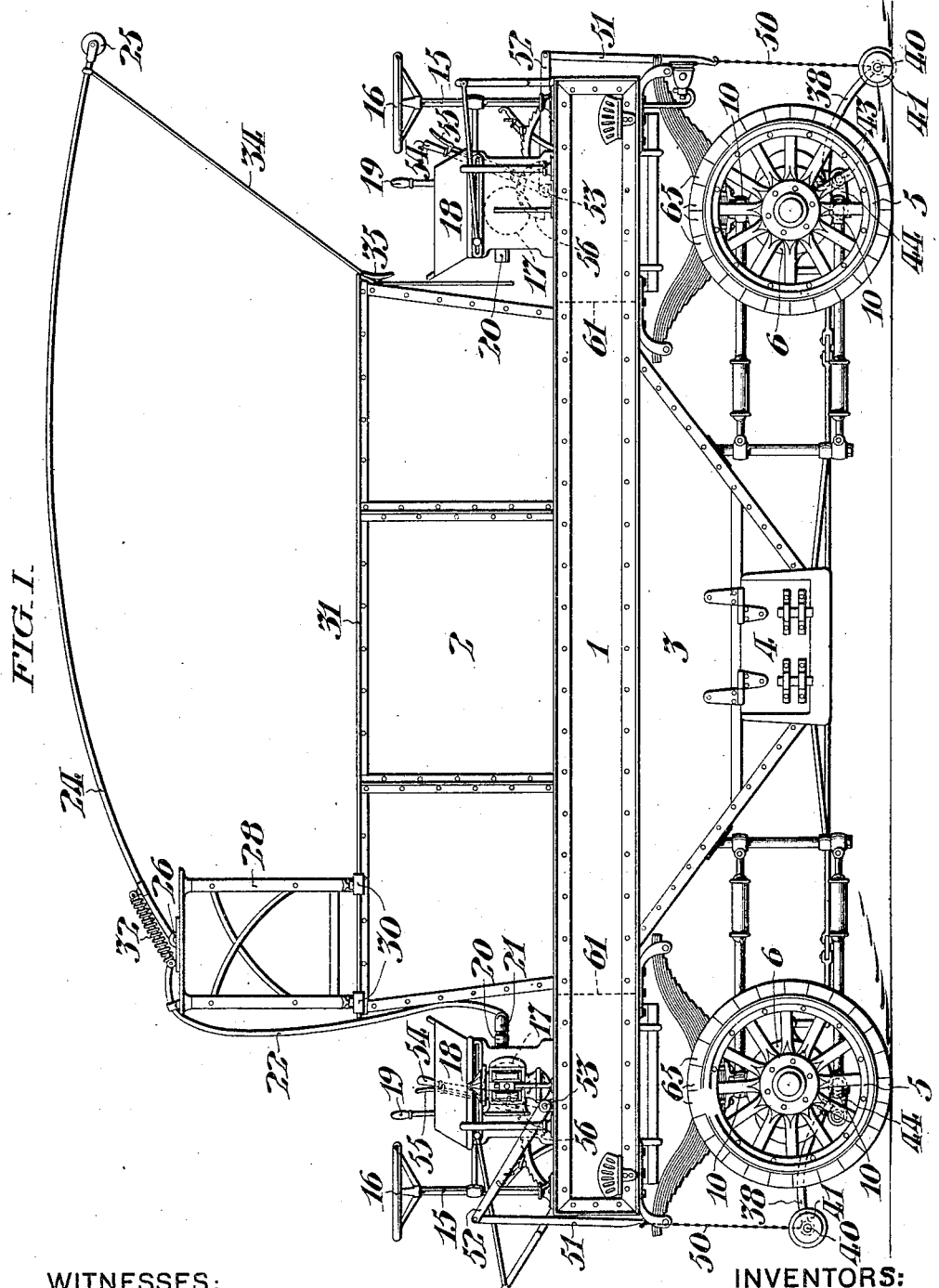

No. 838,283. PATENTED DEC. 11, 1906.
R. THAYER & J. LEDWINKA.
ELECTRICALLY PROPELLED VEHICLE.
APPLICATION FILED MAY 24, 1906.

2 SHEETS—SHEET 1.

WITNESSES:
Clifton C. Hallowell
John C. Bergner

INVENTORS:
RUSSELL THAYER
AND
JOSEPH LEDWINKA,
by Paige, Paul & Foley,
Attys.

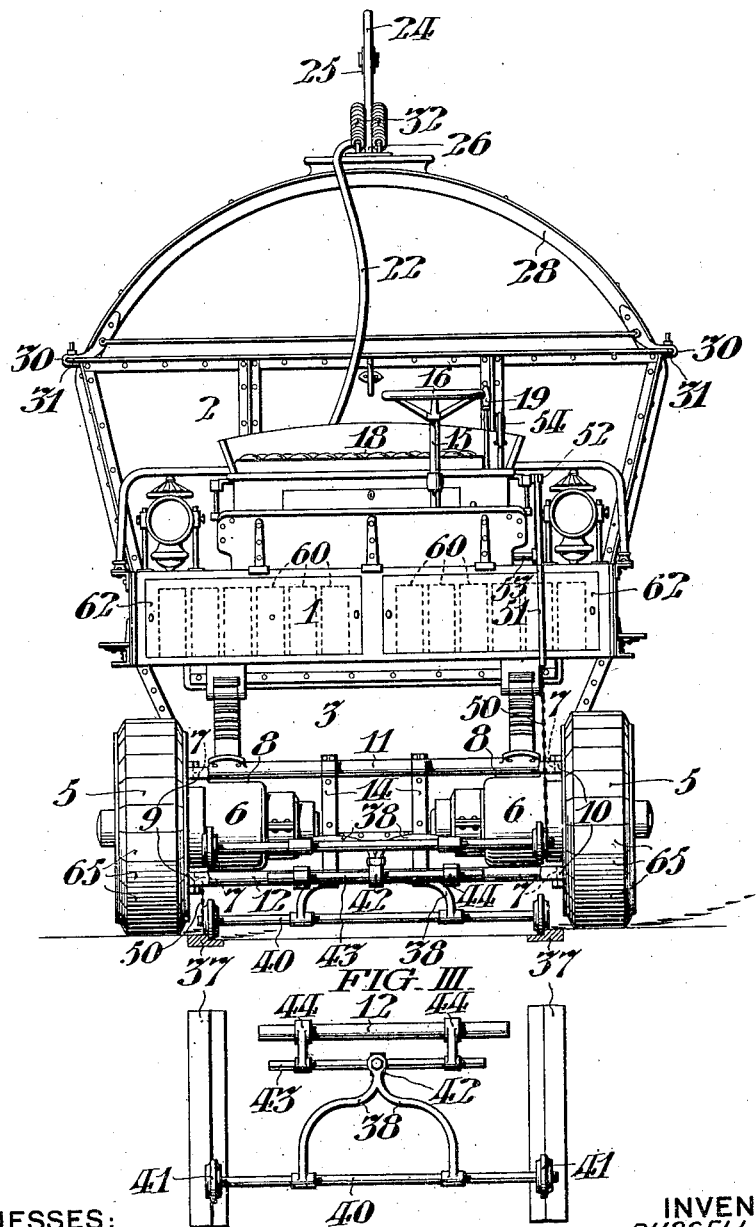

UNITED STATES PATENT OFFICE.

RUSSELL THAYER AND JOSEPH LEDWINKA, OF PHILADELPHIA, PENNSYLVANIA; SAID LEDWINKA ASSIGNOR TO SAID THAYER.

ELECTRICALLY-PROPELLED VEHICLE.

No. 838,283.	Specification of Letters Patent.	Patented Dec. 11, 1906.

Application filed May 24, 1906. Serial No. 318,468.

*To all whom it may concern:*

Be it known that we, RUSSELL THAYER and JOSEPH LEDWINKA, of the city of Philadelphia, in the county of Philadelphia and State of Pennsylvania, have invented a certain new and useful Improvement in Electrically-Propelled Vehicles, whereof the following is a specification, reference being had to the accompanying drawings.

Our improvement relates to an electrically-propelled vehicle which derives its motor-current alternately from an external supply system and from a storage battery carried by the vehicle.

In the form of our invention hereinafter described the vehicle is constructed and arranged to coöperate with a railway supply system whose electric circuit includes an overhead supply-wire and a subjacent track, the latter comprising parallel rails. Said vehicle is provided with wheels which support it independently of said rails while the vehicle-motor is in electrical connection therewith, such connection being effected through contact-wheels, which may be independently raised and lowered in alternation at the respectively opposite ends of the vehicle. Said vehicle is provided with electrical controllers, respectively at opposite ends thereof, and means whereby a trolley-pole for connection with the overhead-supply-wire may be selectively connected with said controllers, said pole being pivotally supported by a bridge extending transversely with respect to the vehicle-body and adjustable in the direction of the length of the vehicle. Said vehicle also comprises motors which are respectively local to said supporting-wheels, and said wheels are independently dirigible to facilitate the progression of the vehicle in limited areas. We also find it convenient to so construct and arrange the electrical circuits in the vehicle that said motors are connected in series relation when operated by the external supply system and in parallel relation when operated by the internal battery-supply system. Moreover, to enable said contact-wheels to retain electrical connection with the track regardless of slight lateral digression of the vehicle said contact-wheels are disposed in axially-connected pairs, and each pair is carried by an independently-movable oscillatory frame in such pivotal connection with the vehicle as to be adjustable transversely with respect to the latter while engaged with said rails.

Our invention comprises the various novel features of construction and arrangement hereinafter more definitely specified.

In the drawings, Figure I is a side elevation of a vehicle conveniently embodying our invention. Fig. II is an end elevation of said vehicle as seen from the left-hand end of Fig. I. Fig. III is a fragmentary plan view showing the construction and arrangement of the means for making contact with the rails.

Referring to Figs. I and II, the vehicle comprises the frame 1, which supports the body 2, which is open at the top and has the hopper-shaped bottom 3, provided with dumping-doors 4, which exist upon opposite sides of said hopper, only one, however, being shown in Fig. I. Said vehicle is provided with four supporting-wheels 5, each having an individual motor 6, and each wheel and its motor may be turned in a horizontal plane upon vertically-disposed trunnions 7, which are in rigid relation with the respective motor-casings 8. Said trunnions 7 are supported in bearings 9 and 10, at the respectively opposite ends of the bars 11 and 12, which bars are rigidly connected by the vertical braces 14 to form axle-frames at the respectively opposite ends of the vehicle. Said wheels 5 are coupled in pairs at the respectively opposite ends of the vehicle, each pair being in operative connection with a vertical shaft 15, provided with a hand-wheel 16, so that said wheels are dirigible by manipulation of said hand-wheels 16 to determine the direction of progression of the vehicle. Said motors may be electrically connected, either in series or parallel relation, with each other by means of controllers 17, which are conveniently located beneath the chauffeurs' seats 18 at the respectively opposite ends of the vehicle, and each comprises an operating-lever 19. Each of said two controllers is provided with a socket 20, arranged to selectively receive the plug 21 on the flexible electrical conductor 22, which latter extends to the pole 24, provided with the trolley 25 at its upper end for electrical connection with an overhead supply-wire. Said pole 24 is pivoted at 26 on the bridge 28, having the bearings 30, which are slidable longitudinally with respect to the vehicle on the flanges 31 at the opposite edges of said vehicle-body 2. Said pole 24 is connected with said bridge 28 by the spring-coupling 32, which tends to normally uplift said pole for engagement with said supply-wire. However, as shown in the drawings, said pole is maintained in lowered position by the rope 34, which is detachably secured at its lower end to the cleat 35 on said body 2.

The railway supply system with which said vehicle is arranged to coöperate comprises an overhead supply-wire, which is located so far above the vehicle as to be necessarily omitted from the drawings, and the subjacent track, comprising the parallel rails 37. Said vehicle is arranged to make electrical connection with said rails 37 alternately at opposite ends of the vehicle by means of the vertically-oscillatory frames 38, which each carry a shaft 40, provided at its opposite ends with contact-wheels 41, which respectively register with said rails 37. Said frames 38 each comprise a bearing 42, which engages a shaft 43, upon which said frame may oscillate vertically and slide laterally, so that said contact-wheels 41 may retain electrical connection with the rails despite slight lateral digression of the vehicle with respect to said rails, it being noted that said vehicle-supporting wheels 5 are axially farther apart than said rails 37, as shown in Fig. II, so as to support said vehicle independently of said rails 37, while the vehicle-motors are in electrical connection with the latter. As indicated in Fig. III, said shaft 43 is rigidly supported by the brackets 44, extending from the axle-frame bar 12.

The electrical contact devices, comprising the frames 38, wheels 41, &c., may be alternately raised and lowered at the respectively opposite ends of the vehicle by means of the flexible connectors 50 and links 51, extending to the levers 52, which are in rigid relation with respective rock-shafts 53, so as to be raised and lowered by means of the hand-levers 54, having the respective detent devices 55, arranged to selectively engage the notches in the sectors 56. It is to be understood that said contact devices, comprising the frames 38 and contact-wheels 41, are only utilized when the vehicle is in connection with the external supply system and are then used in alternation in accordance with the direction of traverse of the vehicle with respect to the overhead wire and subjacent tracks of said external system. For instance, as shown in Fig. I, the vehicle is arranged to traverse in a direction toward the left, the wheels 41 at that end being raised, and thus electrically disconnected, and the wheels 41 at the right-hand end of said vehicle being lowered into electrical connection with the track by the mechanism above described. When it is desired to electrically disconnect the vehicle from the external supply system, both of said frames 38 are uplifted, and switch mechanism adjunctive to the controllers 17, which is contemporaneously operated, changes the connections from the external supply-circuit to the internal supply-circuit, so as to include the batteries 60 in connection with said motors. Said batteries are conveniently located in the receptacles 61, which are provided with the doors 62 at the opposite ends of the vehicle, so that said batteries may be readily accessible.

The vehicle aforesaid is particularly adapted for transporting a large mass of such material as coal—for instance, ten tons—and the bridge 28 is mounted in movable relation with the open-topped body 2 in order that it may be shifted to one end or the other of said body to facilitate the loading of the vehicle, as well as to alternately effect connection between the pole 24 and the respective controllers 17 in accordance with the direction in which it is desired to progress the vehicle.

The arrangement above described, whereby the vehicle may be controlled from either end thereof, is advantageous in that it may be caused to traverse first in one direction and then in the other a street which is too narrow to permit it to turn around—that is to say, the vehicle may be progressed to the left with reference to Fig. I—with the parts in the position shown, and it being desired to then progress the vehicle toward the right with respect to said figure the plug 21 may be removed from the controller-socket 20 at the left-hand end of the vehicle-body 2 and said plug be inserted in the socket 20 at the right-hand end of said vehicle, to which end the chauffeur shifts his position. The wheels 41 at the left-hand end being then lowered and the wheels 41 at the right-hand end being then raised, the vehicle is in condition to be progressed toward the right.

The arrangement of the vehicle-supporting wheels 5 axially farther apart than the parallel tracks 37 affords a basal support for the vehicle commensurate with the abnormally large proportions and capacity contemplated. In this connection it may be noted that the treads of said wheels 5 are formed by blocks 65 of insulating material, so that said wheels not only support the vehicle mechanically independent of the rails 37, but also electrically independent thereof, while the motors are in electrical connection therewith.

It is to be understood that we do not desire to limit ourselves to the precise construction and arrangement of our invention herein set forth, as it is obvious that various modifications may be made therein without departing from the essential features of our invention.

We claim—

1. In an electrically-propelled vehicle which derives its motor-current alternately from an external supply system and from a storage battery carried by the vehicle, constructed and arranged to coöperate with a railway supply system which includes an overhead supply-wire and a subjacent track; a motor; a storage battery; means arranged to removably connect, electrically, with said overhead wire and subjacent track; and, wheels arranged to support said vehicle independently of said track while said motor is in electrical connection therewith, substantially as set forth.

2. In an electrically-propelled vehicle which derives its motor-current alternately from an external supply system and from a storage battery carried by the vehicle, constructed and arranged to coöperate with a railway supply system which includes an overhead supply-wire and a subjacent track comprising parallel rails; a motor; a storage battery; means arranged to removably connect, electrically, with said overhead wire and subjacent track; and, wheels arranged to support said vehicle independently of said track while the vehicle is in electrical connection therewith, said vehicle-supporting wheels being axially farther apart than said rails, substantially as set forth.

3. In an electrically-propelled vehicle which derives its motor-current alternately from an external supply system and from a storage battery carried by the vehicle; a motor; a storage battery; means carried by the vehicle arranged to removably connect electrically with a rail; and, wheels arranged to support said vehicle independently of said rail while said motor is in electrical connection therewith, substantially as set forth.

4. In an electrically-propelled vehicle which derives its motor-current alternately from an external supply system and from a storage battery carried by the vehicle, constructed and arranged to coöperate with a railway supply system which includes an overhead supply-wire and a subjacent track; a motor; a storage battery; a pole carried by the vehicle arranged to removably connect, electrically, with said overhead supply-wire; separate and distinct means respectively located at the opposite ends of said vehicle, arranged to removably connect with said track; and, means whereby said track-connecting means may be raised and lowered in alternation at the respectively opposite ends of the vehicle, substantially as set forth.

5. In an electrically-propelled vehicle which derives its motor-current alternately from an external supply system, and from a storage battery carried by the vehicle, constructed and arranged to coöperate with a railway supply system which includes an overhead supply-wire and a subjacent track; a motor; a storage battery; a pole carried by the vehicle arranged to removably connect, electrically, with said overhead supply-wire; two electrical controllers, respectively at opposite ends of said vehicle; means whereby said pole may be selectively connected with either of said controllers; separate and distinct means respectively located at the opposite ends of said vehicle, arranged to removably connect with said track; and, means whereby said track-connecting means may be independently raised and lowered in alternation at the respectively-opposite ends of the vehicle, substantially as set forth.

In testimony whereof we have hereunto signed our names, at Philadelphia, Pennsylvania, this 23d day of May, 1906.

RUSSELL THAYER.
JOSEPH LEDWINKA.

Witnesses:
ARTHUR E. PAIGE,
CLIFTON C. HALLOWELL.